US010706711B2

(12) United States Patent
Hirose et al.

(10) Patent No.: US 10,706,711 B2
(45) Date of Patent: Jul. 7, 2020

(54) VEHICLE CONTROL DEVICE, VEHICLE CONTROL METHOD, AND STORAGE MEDIUM

(71) Applicant: HONDA MOTOR CO., LTD., Minato-ku, Tokyo (JP)

(72) Inventors: Takafumi Hirose, Wako (JP); Naoto Yasuda, Wako (JP); Yuki Oshitani, Tokyo (JP); Susumu Iwamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/282,337

(22) Filed: Feb. 22, 2019

(65) Prior Publication Data
US 2019/0279487 A1    Sep. 12, 2019

(30) Foreign Application Priority Data

Mar. 9, 2018    (JP) .................................. 2018-043448

(51) Int. Cl.
*G08B 21/24*    (2006.01)
*G06K 9/00*    (2006.01)
(Continued)

(52) U.S. Cl.
CPC ........... *G08B 21/24* (2013.01); *G05D 1/0088* (2013.01); *G06K 9/00832* (2013.01); *H04W 4/40* (2018.02); *G05D 2201/0213* (2013.01)

(58) Field of Classification Search
None
See application file for complete search history.

(56) References Cited

U.S. PATENT DOCUMENTS 6,194,997 B1 *  2/2001  Buchner ................. B60R 25/24
                                                    307/10.2
7,408,445 B1 *  8/2008  Cunningham ........... B60Q 9/00
                                                    180/271
(Continued)

FOREIGN PATENT DOCUMENTS

DE    102018008244 A1 *  4/2019 ........... B60R 16/023
JP    2015-041344            3/2015
(Continued)

OTHER PUBLICATIONS

Japanese Office Action for Japanese Patent Application No. 2018-043448 dated Dec. 3, 2019.

*Primary Examiner* — Chico A Foxx
(74) *Attorney, Agent, or Firm* — Amin, Turocy & Watson, LLP

(57) ABSTRACT

A vehicle control device (100) includes a recognizer (130) that recognizes a surrounding situation of an automatically driven vehicle, and a driving controller (120, 160) that automatically controls acceleration/deceleration and steering of the automatically driven vehicle on the basis of a result of the surrounding situation recognized by the recognizer and also includes a situation information acquirer that acquires situation information indicating an in-vehicle situation of an automatically driven vehicle, a detector that detects a forgotten item that is left in the automatically driven vehicle on the basis of the situation information acquired by the situation information acquirer, and a controller that controls the automatically driven vehicle on the basis of a result of the detection of the detector.

15 Claims, 6 Drawing Sheets

(51) Int. Cl.
*G05D 1/00* (2006.01)
*H04W 4/40* (2018.01)

(56) References Cited

U.S. PATENT DOCUMENTS

| | | | | |
|---|---|---|---|---|
| 9,014,920 B1* | 4/2015 | Torres | G08B 13/00 | 701/45 |
| 9,604,571 B1* | 3/2017 | Kurtovic | G08B 21/22 | |
| 9,847,004 B1* | 12/2017 | Lan | G08B 21/24 | |
| 10,214,118 B1* | 2/2019 | Jain | B60N 2/0244 | |
| 10,223,844 B1* | 3/2019 | Schwie | G07C 5/008 | |
| 10,282,625 B1* | 5/2019 | Wengreen | G06K 9/00845 | |
| 10,289,922 B1* | 5/2019 | Wengreen | G06K 9/00832 | |
| 2005/0057350 A1* | 3/2005 | Younse | B60N 2/002 | 340/457.1 |
| 2007/0046451 A1* | 3/2007 | Bihya | G08B 21/22 | 340/438 |
| 2007/0268119 A1* | 11/2007 | Cram | B60Q 9/00 | 340/457 |
| 2008/0061925 A1* | 3/2008 | Bergerhoff | B60R 25/24 | 340/5.6 |
| 2010/0217457 A1* | 8/2010 | Georgi | G07C 9/00309 | 701/2 |
| 2010/0271171 A1* | 10/2010 | Sampei | B60R 25/00 | 340/5.6 |
| 2013/0154819 A1* | 6/2013 | Stefanovski | H04W 4/48 | 340/457 |
| 2013/0257604 A1* | 10/2013 | Mirle | B60R 16/02 | 340/425.5 |
| 2013/0265178 A1* | 10/2013 | Tengler | G08G 1/091 | 340/989 |
| 2014/0277935 A1* | 9/2014 | Daman | B60N 2/28 | 701/36 |
| 2015/0193729 A1* | 7/2015 | Van Wiemeersch | G06Q 10/087 | 701/2 |
| 2015/0193996 A1* | 7/2015 | Van Wiemeersch | G06Q 20/00 | 340/5.72 |
| 2016/0203703 A1* | 7/2016 | Graeve | G08B 25/10 | 455/404.1 |
| 2017/0103638 A1* | 4/2017 | Henry | G08B 21/24 | |
| 2017/0116839 A1* | 4/2017 | Friedman | B60N 2/002 | |
| 2018/0053398 A1* | 2/2018 | Kharbawi | G08B 21/22 | |
| 2018/0065504 A1* | 3/2018 | Lan | B60W 10/30 | |
| 2018/0068544 A1* | 3/2018 | Caperell | G08B 21/22 | |
| 2018/0126960 A1* | 5/2018 | Reibling | B60S 1/64 | |
| 2018/0174419 A1* | 6/2018 | Biondo | G08B 21/0205 | |
| 2018/0197029 A1* | 7/2018 | Ali | E05F 15/74 | |
| 2018/0322775 A1* | 11/2018 | Chase | G05D 1/0088 | |
| 2019/0122460 A1* | 4/2019 | Reyes | G08G 1/166 | |
| 2020/0005044 A1* | 1/2020 | Nakamura | G06K 9/00832 | |

FOREIGN PATENT DOCUMENTS

| | | |
|---|---|---|
| JP | 2017-182301 | 10/2017 |
| WO | 2017/093196 | 6/2017 |

* cited by examiner

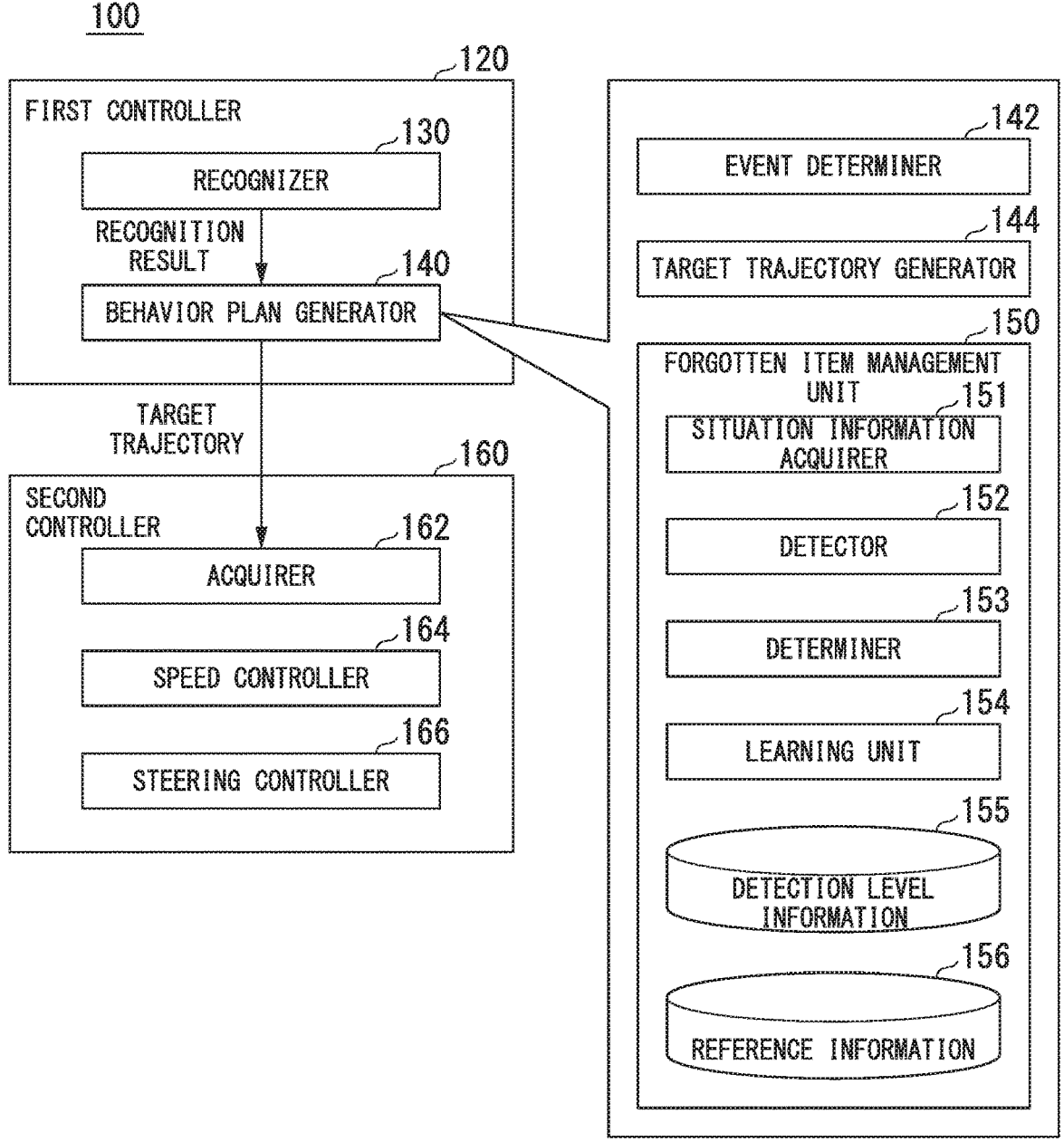

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-043448, filed Mar. 9, 2018, the content of which is incorporated herein by reference.

BACKGROUND

The present invention relates to a vehicle control device, a vehicle control method, and a storage medium.

DESCRIPTION OF RELATED ART

In the related art, a forgotten item detection technology which checks whether or not a passenger has forgotten to take an item in a passenger vehicle such as a taxi when the passenger alights the vehicle has been disclosed (for example, see Japanese Unexamined Patent application, First Publication No. 2015-41344). According to the technology described in Patent Document 1, image data captured by infrared rays when the passenger boards and alights the vehicle is compared and analyzed and it is determined that there is a forgotten item if an item which was not present in the occupant compartment of the vehicle before the passenger boards the vehicle is present in the occupant compartment when the passenger has alighted the vehicle.

SUMMARY

However, the technology of the related art does not perform processing by associating detection of a forgotten item with driving control when automated driving is performed. Therefore, there is a possibility that a forgotten item may be overlooked during automated driving.

The present invention has been made in view of such circumstances and it is an object of the present invention to provide a vehicle control device, a vehicle control method, and a storage medium which can more efficiently prevent riders from forgetting to take items.

A vehicle control device, a vehicle control method, and a storage medium according to the present invention adopt the following configurations.

(1) A vehicle control device according to an aspect of the present invention includes a situation information acquirer configured to acquire situation information indicating an in-vehicle situation of an automatically driven vehicle, a detector configured to detect a forgotten item that is left in the automatically driven vehicle on the basis of the situation information acquired by the situation information acquirer, and a controller configured to control the automatically driven vehicle on the basis of a result of the detection of the detector.

(2) In the above aspect (1), the detector is configured to acquire information indicating a property of a rider of the automatically driven vehicle and to change a reference for detecting the forgotten item according to the acquired information indicating the property of the rider.

(3) In the above aspect (2), the detector is configured to change the reference for detecting the forgotten item according to whether the rider of the automatically driven vehicle is an owner of the automatically driven vehicle or a temporary user thereof.

(4) In the above aspect (2), the controller is configured to, if the forgotten item is detected by the detector, cause the automatically driven vehicle to travel with a behavior different from a predetermined behavior after the rider alights the automatically driven vehicle.

(5) In the above aspect (4), the different behavior includes causing the automatically driven vehicle not to start or causing the automatically driven vehicle to travel to a destination different from a destination set in the predetermined behavior.

(6) In the above aspect (2), the situation information acquirer is configured to predict alighting of the rider, and the controller is configured to, if the situation information acquirer predicts that the rider is about to alight the vehicle, instruct a discharge mechanism associated with an accommodation space to discharge the forgotten item accommodated in the accommodation space into a space in the vehicle.

(7) In the above aspect (2), the situation information acquirer is configured to predict alighting of the rider, and the situation information acquirer is configured to, if the situation information acquirer predicts that the rider is about to alight the vehicle, cause a notification unit to output notification information including at least one of presence of the forgotten item or a position of the forgotten item.

(8) In the above aspect (7), the notification unit is configured to, after the rider alights the automatically driven vehicle, output the notification information if the automatically driven vehicle is set to travel toward a destination outside a predetermined range including a position where the rider alights the automatically driven vehicle.

(9) In the above aspect (2), the detector is configured to detect the forgotten item using reference information which is stored in a storage portion and based on an in-vehicle situation in a state without the forgotten item, and the vehicle control device further includes a learning unit configured to learn the reference information on the basis of at least one of registration information registered by the rider or the situation information.

(10) In the above aspect (9), the learning unit is configured to learn the reference information on the basis of a result of comparison between a situation before the rider alights the vehicle and a situation after the rider alights the vehicle.

(11) In the above aspect (1), the detector is configured to detect an object that satisfies a predetermined condition among objects left in the automatically driven vehicle as the forgotten item.

(12) A vehicle control method according to an aspect of the present invention includes a computer acquiring situation information indicating a usage situation of in-vehicle equipment of an automatically driven vehicle, detecting a forgotten item that is left in the automatically driven vehicle on the basis of the acquired situation information, and controlling the automatically driven vehicle on the basis of a result of the detection.

(13) A non-transitory computer-readable recording medium recording a vehicle control program causing an in-vehicle computer to acquire situation information indicating a usage situation of in-vehicle equipment of an automatically driven vehicle, to detect a forgotten item that is left in the automatically driven vehicle on the basis of the acquired situation information, and to control the automatically driven vehicle on the basis of a result of the detection.

Advantageous Effects

According to the above aspects (1) to (13), it is possible to more efficiently prevent the rider from forgetting to take items.

In addition, according to the above aspects (4) and (11), it is possible to control the automatically driven vehicle such that, if a forgotten item of the rider is detected, the vehicle behaves for the purpose of the rider's collection of the forgotten item.

BRIEF DESCRIPTION OF THE DRAWINGS

FIG. 3 is a functional configuration diagram of a first controller and a second controller.

FIG. 4 is a diagram showing exemplary setting of the detection levels of items by a forgotten item management unit.

DESCRIPTION OF EMBODIMENTS

Hereinafter, embodiments of a vehicle control device, a vehicle control method, and a storage medium of the present invention will be described with reference to the drawings.

First Embodiment

[Overall Configuration]

Figure 1:
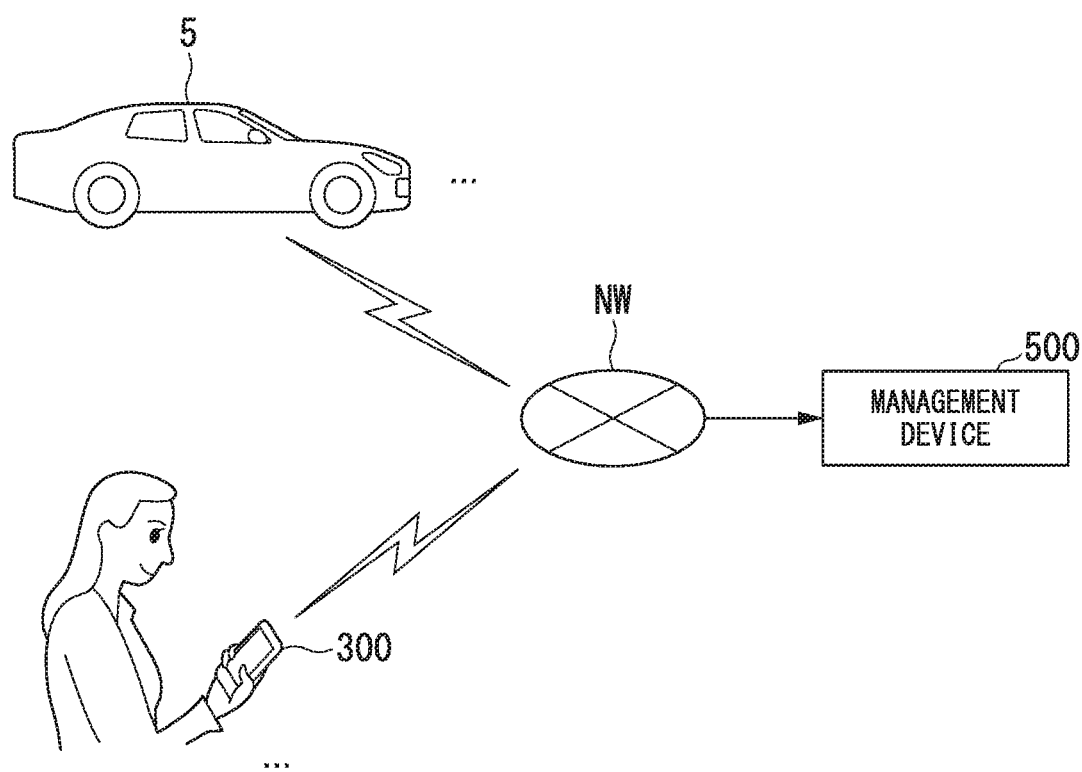
FIG. 1 is a diagram showing a configuration of a vehicle control system.

FIG. 1 is a configuration diagram of a vehicle control system 1 according to a first embodiment. The vehicle control system 1 is realized by one or more processors (computers). The vehicle control system 1 includes, for example, one or more vehicle control devices 5, one or more terminal devices 300, and a management device 500. Each vehicle control device 5 is an in-vehicle device that is mounted in an automatically driven vehicle having an automated driving function. The automatically driven vehicle is, for example, a private vehicle of an owner X. That is, the owner X is the owner of the automatically driven vehicle. Each terminal device 300 is a terminal device owned by the owner X. The terminal device 300 is, for example, a portable terminal device having at least a communication function and an information input/output function such as a mobile phone such as a smartphone, a tablet terminal, a notebook computer, or a personal digital assistant (PDA). The management device 500 communicates with the vehicle control devices 5 and the terminal devices 300 and provides various information.

The vehicle control devices 5, the terminal devices 300, and the management device 500 are connected to each other through a network NW and communicate with each other via the network NW. The network NW includes, for example, some or all of a wide area network (WAN), a local area network (LAN), the Internet, a dedicated line, a radio base station, a provider, and the like.

A vehicle M may be used only by the owner of the vehicle M and a person to whom the owner of the vehicle M has given permission for use or may be a ride share vehicle, a rental car, or a taxi vehicle. Ride share vehicles are vehicles used in such a manner that one or more vehicles are used in common by a plurality of users.

[Terminal Device]

The terminal device 300 is, for example, a smartphone or a tablet computer held by a rider of the vehicle M. The rider of the vehicle M can input or manage the time to use the vehicle M, the destination when it is used, a behavior schedule of the rider, or the like by operating the terminal device 300. An application program for schedule management is installed in the terminal device 300. The application program is provided, for example, by a server which is under the management of an automobile manufacturer. The terminal device 300 transmits information input by the rider to the vehicle M. The information (for example, the destination and the time to use) input by the rider is acquired and managed by a navigation device of the vehicle M. The rider of the vehicle M may also input the time to use the vehicle M, the destination when it is used, the behavior schedule of the rider, or the like by operating an HMI 30 of the vehicle M, instead of operating the terminal device 300.

[Management Device]

The management device 500 has, for example, the functionality of a management server that centrally manages the schedules of riders. For example, the management device 500 is managed and operated by an automobile manufacturer or a ride share administrator, and acquires the schedule of the rider transmitted from the terminal device 300 and causes a storage portion (not shown) of the management device 500 to store schedule information in which the acquired schedule is associated with a calendar stored in the storage portion. When the vehicle M is a ride shared vehicle, the management device 500 manages a schedule specifying which vehicle is to be allocated to which rider, in addition to and in combination with the schedule of the rider.

The management device 500 is synchronized with the terminal device 300 to update the schedule information of the rider at the timing of acquiring the schedule from the terminal device 300 or at a predetermined timing. The management device 500 provides the schedule information of the rider to the vehicle M when there is an inquiry about the schedule of the rider. The management device 500 may also update the schedule of the rider on the basis of information input by operating the HMI 30 provided in the vehicle.

[Vehicle Control Device]

Figure 2:
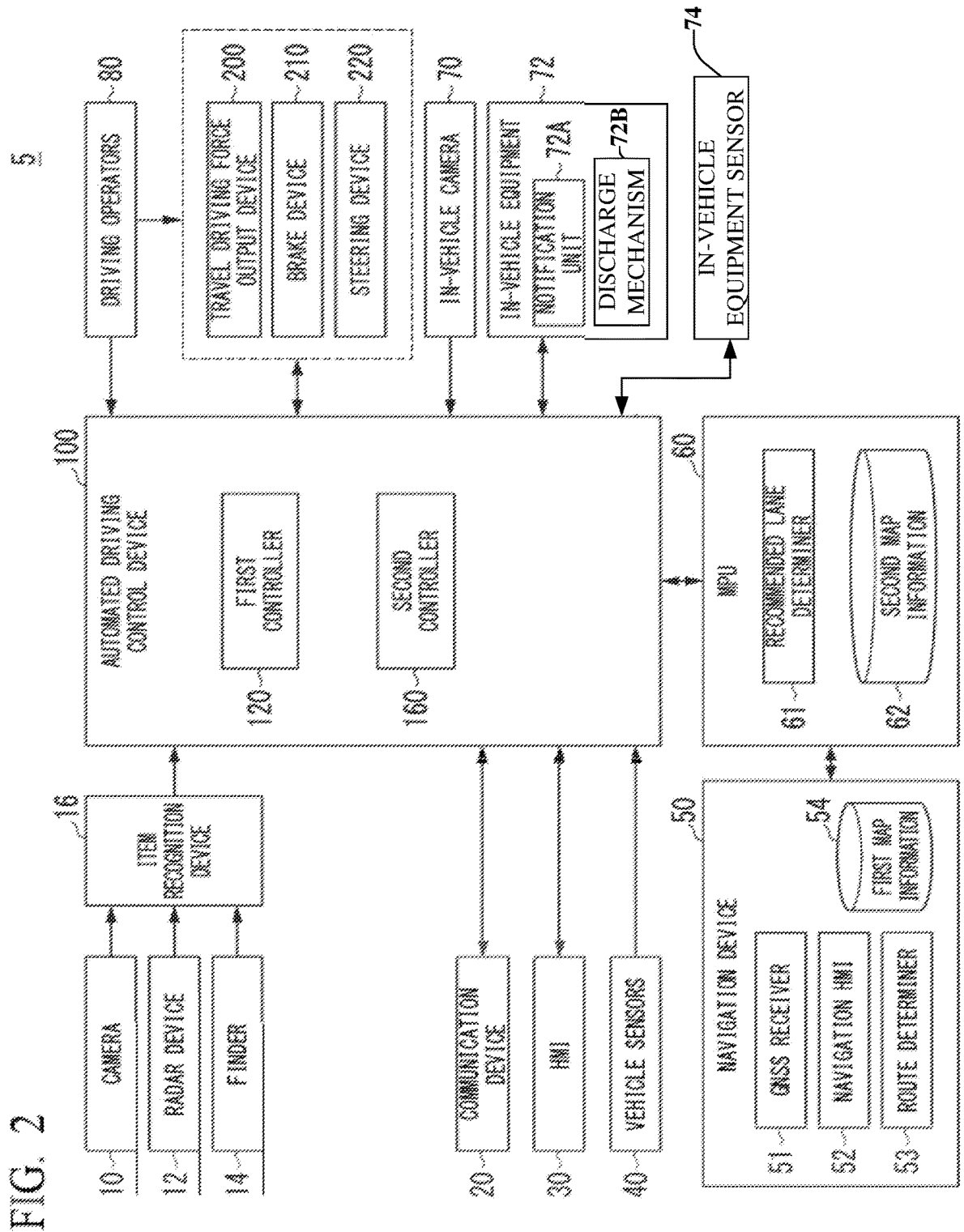
FIG. 2 is a configuration diagram of a vehicle control system using a vehicle control device according to an embodiment.

Next, a vehicle control device 5 will be described. FIG. 2 is a configuration diagram of the vehicle control device 5 according to the first embodiment. A vehicle in which the vehicle control device 5 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle control device 5 includes, for example, a camera 10, a radar device 12, a finder 14, an item recognition device 16, a communication device 20, an HMI 30, vehicle sensors 40, a navigation device 50, a map positioning unit (MPU) 60, driving operators 80, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 2 are merely an example and some of the components may be omitted or other components may be added.

The camera 10 is, for example, a digital camera using a solid-state imaging device such as a charge coupled device (CCD) or complementary metal oxide semiconductor (CMOS) image sensor. The camera 10 is attached to the vehicle in which the vehicle control device 5 is mounted (hereinafter referred to as a vehicle M) at an arbitrary location. For imaging the area in front of the vehicle, the camera 10 is attached to an upper portion of a front windshield, a rear surface of a rearview mirror, or the like. For example, the camera 10 repeats imaging of the surroundings of the vehicle M at regular intervals. The camera 10 may also be a stereo camera.

The radar device 12 radiates radio waves such as millimeter waves around the vehicle M and detects radio waves reflected by an item (reflected waves) to detect at least the position (distance and orientation) of the item. The radar device 12 is attached to the vehicle M at an arbitrary location. The radar device 12 may detect the position and velocity of an item using a frequency modulated continuous wave (FM-CW) method.

The finder 14 is a light detection and ranging (LIDAR) finder. The finder 14 illuminates the surroundings of the vehicle M with light and measures scattered light. The finder 14 detects the distance to a target on the basis of a period of time from when light is emitted to when light is received. The light radiated is, for example, pulsed laser light. The finder 14 is attached to the vehicle M at an arbitrary location.

The item recognition device 16 performs a sensor fusion process on results of detection by some or all of the camera 10, the radar device 12, and the finder 14 to recognize the position, type, speed, or the like of the item. The item recognition device 16 outputs the recognition result to the automated driving control device 100. The item recognition device 16 may output detection results of the camera 10, the radar device 12 and the finder 14 to the automated driving control device 100 as they are. The item recognition device 16 may be omitted from the vehicle control device 5.

For example, the communication device 20 communicates with other vehicles near the vehicle M using a cellular network, a Wi-Fi network, Bluetooth (registered trademark), dedicated short range communication (DSRC) or the like or communicates with various server devices via wireless base stations.

The HMI 30 presents various types of information to a rider in the vehicle M and receives an input operation from the rider. The HMI 30 includes various display devices, a speaker, a buzzer, a touch panel, switches, keys, or the like.

The vehicle sensors 40 include a vehicle speed sensor that detects the speed of the vehicle M, an acceleration sensor that detects the acceleration thereof, a yaw rate sensor that detects an angular speed thereof about the vertical axis, an orientation sensor that detects the orientation of the vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the vehicle M on the basis of signals received from GNSS satellites. The position of the vehicle M may also be specified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determiner 53 determines a route from the position of the vehicle M specified by the GNSS receiver 51 (or an arbitrary input position) to a destination input by the rider (hereinafter referred to as an on-map route) using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The on-map route is output to the MPU 60. The navigation device 50 may also perform route guidance using the navigation HMI 52 on the basis of the on-map route. The navigation device 50 may be realized, for example, by a function of a terminal device such as a smartphone or a tablet possessed by the rider. The navigation device 50 may also transmit the current position and the destination to a navigation server via the communication device 20 and acquire a route equivalent to the on-map route from the navigation server.

The MPU 60 includes, for example, a recommended lane determiner 61 and holds second map information 62 in a storage device such as an HDD or a flash memory. The recommended lane determiner 61 divides the on-map route provided from the navigation device 50 into a plurality of blocks (for example, into blocks each 100 meters long in the direction in which the vehicle travels) and determines a recommended lane for each block by referring to the second map information 62. The recommended lane determiner 61 determines the recommended lane such that it is given a position in a lane order counted from the leftmost lane. When there is a branch point on the on-map route, the recommended lane determiner 61 determines a recommended lane such that the vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The second map information 62 may be updated as needed by the communication device 20 communicating with another device.

The presence, position, or the like of an item in the occupant compartment are detected on the basis of a detection result of at least one of an in-vehicle camera 70, in-vehicle equipment 72, and an in-vehicle equipment sensor 74. The in-vehicle camera 70 is, for example, a digital camera using a solid-state imaging device such as a CCD or CMOS imaging device. The in-vehicle camera 70 is attached to the vehicle M at various locations including a seat's foot, the inside of the trunk, and the like.

The in-vehicle equipment 72 is equipment mounted in an automatically driven vehicle and includes, for example, a cup holder, a storage pocket, a storage box provided in a dashboard, a magazine insertion pocket, a DVD reproduction device, a CD reproduction device, other information processing devices, a safety device, an in-vehicle ETC device, a billing processing device, a settlement processing device, and the like. The in-vehicle equipment 72 acquires information indicating a usage situation and outputs it to the automated driving control device 100. For example, the in-vehicle equipment 72 includes a detector or the like for detecting an object accommodated in an accommodation space and acquires information indicating the usage situation on the basis of a detection result of the detector. Further, the in-vehicle equipment 72 includes a notification unit 72A. The notification unit 72A is, for example, a display device such as a light emitting diode (LED) that is installed at a location which is within the field of view of the rider.

The in-vehicle equipment sensor 74 is installed in an accommodation space in which a rider temporarily installs or stores an item, such as a seat seating surface, a seat's foot, or the inside of the trunk, and senses the presence of an item brought in by the rider. The in-vehicle equipment sensor 74 is, for example, a pressure sensor, an infrared sensor, or a current sensor. In addition, when an IC tag is attached to an item in the occupant compartment or when it is an item that transmits weak radio waves, the in-vehicle equipment sensor 74 may detect the item using the IC tag or weak radio waves. The in-vehicle equipment sensor 74 is installed at a location where it is difficult for the in-vehicle camera 70 and the in-vehicle equipment 72 to identify the presence of an item.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or some or all of the travel driving force output device 200, the brake device 210, and the steering device 220.

The automated driving control device 100 includes, for example, a first controller 120 and a second controller 160. Each of the first controller 120 and the second controller 160 is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in a storage device such as an HDD or a flash memory in the automated driving control device 100 in advance or may be stored in a detachable storage medium such as a DVD or a CD-ROM and then installed in the HDD or flash memory in the automated driving control device 100 by inserting the storage medium into a drive device.

FIG. 3 is a functional configuration diagram of the first controller 120 and the second controller 160. The first controller 120 includes, for example, a recognizer 130 and a behavior plan generator 140. For example, the first controller 120 realizes a function based on artificial intelligence (AI) and a function based on a previously given model in parallel. For example, the function of "recognizing an intersection" is realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes states of an item near the vehicle M such as the position, speed and acceleration thereof on the basis of information input from the camera 10, the radar device 12, and the finder 14 via the item recognition device 16. The position of the item is recognized, for example, as a position in an absolute coordinate system whose origin is at a representative point on the vehicle M (such as the center of gravity or the center of a drive axis thereof), and used for control. The position of the item may be represented by a representative point on the item such as the center of gravity or a corner thereof or may be represented by an expressed region. The "states" of the item may include an acceleration or jerk of the item or a "behavior state" thereof (for example, whether or not the item is changing or is going to change lanes).

The recognizer 130 recognizes, for example, a (traveling) lane in which the vehicle M is traveling. For example, the recognizer 130 recognizes the traveling lane, for example, by comparing a pattern of road lane lines (for example, an arrangement of solid and broken lines) obtained from the second map information 62 with a pattern of road lane lines near the vehicle M recognized from an image captured by the camera 10. The recognizer 130 may recognize the traveling lane by recognizing travel boundaries (road boundaries) including road lane lines, road shoulders, curbs, a median strip, guard rails, or the like, without being limited to road lane lines. This recognition may be performed taking into consideration a position of the vehicle M acquired from the navigation device 50 or a result of processing by the INS. The recognizer 130 recognizes temporary stop lines, obstacles, red lights, toll gates, and other road phenomena.

When recognizing the traveling lane, the recognizer 130 recognizes the position or attitude of the vehicle M with respect to the traveling lane. For example, the recognizer 130 may recognize both a deviation from the lane center of the reference point of the vehicle M and an angle formed by the travel direction of the vehicle M relative to an extension line of the lane center as the relative position and attitude of the vehicle M with respect to the traveling lane. Alternatively, the recognizer 130 may recognize the position of the reference point of the vehicle M with respect to one of the sides of the traveling lane (a road lane line or a road boundary) or the like as the relative position of the vehicle M with respect to the traveling lane.

The behavior plan generator 140 generates a target trajectory along which the vehicle M will travel in the future automatically (independently of the driver's operation), basically such that the vehicle M travels in the recommended lane determined by the recommended lane determiner 61 and copes with situations occurring near the vehicle M. The target trajectory includes, for example, a speed element. The target trajectory is expressed, for example, by an arrangement of points (trajectory points) which are to be reached by the vehicle M in order. The trajectory points are points to be reached by the vehicle M at intervals of a predetermined travel distance (for example, at intervals of about several meters) along the road. Apart from this, a target speed and a target acceleration for each predetermined sampling time (for example, every several tenths of a second) are determined as a part of the target trajectory. The trajectory points may be respective positions at the predetermined sampling times which the vehicle M is to reach at the corresponding sampling times. In this case, information on the target speed or the target acceleration is represented with the interval between the trajectory points.

When generating the target trajectory, the behavior plan generator 140 may set an automated driving event. Examples of the automated driving event include a constant-speed travel event, a low-speed following travel event, a lane change event, an intersection passing event, a branching event, a merging event, and a takeover event. The behavior plan generator 140 generates the target trajectory according to an activated event. The functions of the event determiner 142, the target trajectory generator 144, and the forgotten item management unit 150 of the behavior plan generator 140 will be described later.

The second controller 160 controls the travel driving force output device 200, the brake device 210, and the steering device 220 such that the vehicle M passes through the target trajectory generated by the behavior plan generator 140 at scheduled times.

Returning to FIG. 3, the second controller 160 includes, for example, an acquirer 162, a speed controller 164, and a steering controller 166. The acquirer 162 acquires information on the target trajectory (trajectory points) generated by the behavior plan generator 140 and stores it in a memory (not shown). The speed controller 164 controls the travel driving force output device 200 or the brake device 210 on the basis of the speed element included in the target trajectory stored in the memory. The steering controller 166 controls the steering device 220 according to the degree of curvature of the target trajectory stored in the memory. The processing of the speed controller 164 and the steering controller 166 is realized, for example, by a combination of feedforward control and feedback control. As one example, the steering controller 166 performs the processing by combining feedforward control according to the curvature of the road ahead of the vehicle M and feedback control based on deviation from the target trajectory.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque associated with a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the second controller 160 or information input from the driving operators 80 to change the direction of the steering wheels.

[Functions of Forgotten Item Management Unit]

For example, the forgotten item management unit 150 includes a situation information acquirer 151, a detector 152, a determiner 153, a learning unit 154, detection level information 155, and reference information 156. The situation information acquirer 151 acquires situation information. The situation information is, for example, information such as information as to who the rider is, which item has been brought into the vehicle by the rider, and the boarding/alighting schedule of the rider. From the situation information acquired by the situation information acquirer 151, the detector 152 detects what is estimated to be a forgotten item of the rider which is left in the automatically driven vehicle (hereinafter, referred to as a candidate forgotten item). The candidate forgotten item may sometimes be a forgotten item of the rider and may also sometimes be an item which the rider has intentionally left in the vehicle, that is, an item which is not to be notified as a forgotten item. The determiner 153 determines whether or not to notify the rider of the candidate forgotten item detected by the detector 152 and performs driving control of the vehicle M such that it performs a predetermined behavior on the basis of the determination result. The predetermined behavior will be described later. The learning unit 154 stores and learns the recognition result of the situation information acquirer 151, the detection result of the detector 152, and the determination result of the determiner 153. The detection level information 155 stores a setting of references for detection as candidate forgotten items. The reference information 156 stores information on items which are to be detected as candidate forgotten items and information on items which are not to be detected as candidate forgotten items. The detection level information 155 and the reference information 156 are examples of the storage portion.

[Functions of Situation Information Acquirer]

For example, the situation information acquirer 151 identifies whether the rider is the owner of the vehicle M, a person to whom the owner of the vehicle M has given permission for use (for example, a member of the owner's family when the vehicle M is a personally owned vehicle or an employee when the vehicle M is a company vehicle), or a guest. The guest is, for example, a temporary user of the vehicle M such as a ride share rider or a rider who uses a rental car or a taxi. In the following description, a ride share rider is used as an example of the guest. The situation information acquirer 151 may perform face authentication of the rider recognized by the recognizer 130 or the in-vehicle camera 70, or may perform biometric authentication based on other physical features such as a fingerprint or an iris. For example, the situation information acquirer 151 may recognize that the rider is a ride share rider from the fact that the rider unlocks the vehicle with an authentication key issued for use in a ride share (which may be an actual key or may be an authentication using data such as a QR code (registered trademark) or a token). The situation information acquirer 151 may also acquire information identifying a ride share rider from the management device 500. The situation information acquirer 151 outputs the recognition result of the rider to the detector 152. Whether the rider is the owner of the vehicle M, a person to whom the owner of the vehicle M has given permission for use, or a guest, which is identified by the situation information acquirer 151, is an example of a property of the rider.

For example, the situation information acquirer 151 analyzes image data captured before the rider boards the vehicle to recognize an in-vehicle fitting. The in-vehicle fitting is an item that the owner of the vehicle M has installed in the vehicle M assuming that it is to remain in the vehicle M. The in-vehicle fitting is, for example, a cushion, a tissue box, or a tire chain. The situation information acquirer 151 analyzes the outline and position of an item recognized by the in-vehicle camera 70 and holds the analysis result.

The situation information acquirer 151 also recognizes an item brought in by the rider, for example, by comparing image data captured before and after boarding of the rider.

The situation information acquirer 151 analyzes the outline and position of the item recognized by the in-vehicle camera 70 and holds the analysis result. Further, the situation information acquirer 151 recognizes the presence of an item in the occupant compartment on the basis of the recognition result of the in-vehicle equipment sensor 74 and the in-vehicle equipment 72. The situation information acquirer 151 compares before-and-after captured image data, such as before the rider of the vehicle M boards (when the vehicle M is unlocked), when the vehicle M starts, and when the rider is on board, and recognizes that an item is present or that an item is not present (it was collected by the rider) on the basis of the comparison result. The situation information acquirer 151 outputs the recognition result of the item to the detector 152.

The situation information acquirer 151 also acquires, for example, a boarding/alighting schedule relating to the identified rider from the HMI 30, the terminal device 300, the management device 500, or the like.

The situation information acquirer 151 recognizes the behavior of the rider of the vehicle M and predicts that the rider is about to alight the vehicle. The situation information acquirer 151 predicts that the rider is about to alight the vehicle and outputs an instruction to the detector 152 such that it performs a process for detecting candidate forgotten items, for example, when the rider has unlocked a door of the vehicle to actually alight the vehicle or when at least one condition is satisfied among conditions where it is assumed that rider is about to alight, such as when the driving source of the vehicle M has stopped, when the vehicle M has arrived near the destination of a previously acquired alighting schedule of the rider, when a scheduled alighting time of the rider has been reached, when a state in which the rider is preparing to alight has been recognized, or when the rider has removed his or her seatbelt.

[Functions of Detector]

When an instruction to detect candidate forgotten items has been output from the situation information acquirer 151, the detector 152 recognizes that the rider is about to alight the vehicle and detects a candidate forgotten item on the basis of the recognition result of the rider and the recognition result of an item brought in by the rider. For example, when an in-vehicle fitting has been recognized, the detector 152 recognizes that it is not a candidate forgotten item, and when an item that is not an in-vehicle fitting has been recognized, the detector 152 recognizes that it is a candidate forgotten item.

The detector 152 performs a process for detecting candidate forgotten items on the basis of a recognition result indicating that the rider is about to alight, which has been obtained by the situation information acquirer 151. Further, the detector 152 adjusts the degree of detection of the candidate forgotten item on the basis of the recognition result of the rider output from the situation information acquirer 151. For example, upon determining that the rider is the owner of the vehicle M, the detector 152 performs the adjustment such that the rider is to be notified of an item with a higher detection level among items preset by the owner of the vehicle M as a candidate forgotten item and not to be notified of an item with a lower detection level as a candidate forgotten item. For example, upon determining that the rider is a guest, the detector 152 detects all items brought in by the guest as candidate forgotten items, regardless of the setting of detection levels. The detector 152 outputs information on the detected candidate forgotten item to the determiner 153.

FIG. 4 is a diagram showing an example of the content of a setting list of the detection levels of items preset by the rider. In FIG. 4, for example, the detection levels are set to four levels (high, slightly high, slightly low, and low). As shown in FIG. 4, for example, the rider sets the wallet as an item with a detection level of "high" and sets the bag as an item with a detection level of "slightly low." Item information (for example, the wallet and bag) registered in the setting list is an example of the "reference information." The setting list is stored, for example, in the detection level information 155. Although an example of the setting of the detection levels of items is shown in the example of FIG. 4, the detection levels may also be set, for example, for accommodation spaces. For example, the detection levels of items stored in a glove box are set to "low" in the setting list. Conditions defined by the setting list are examples of the "predetermined condition."

It is to be noted that whether higher priority is given to the setting of the detection level of the item in the setting list or to the setting of the detection level of the accommodation space may be determined by applying whichever of the settings with a higher detection level or may be settable by the owner of the vehicle M. For example, when the wallet which is an item with a detection level set to "high" is stored in the storage box of the dashboard which is an accommodation space with a detection level set to "low," the detector 152 gives priority to the setting of the item and sets the detection level to "high."

The detector 152 also detects whether or not the detected candidate forgotten item has been collected by the rider. When the detector 152 has detected the presence of a candidate forgotten item that is left by the rider, the detector 152 outputs the detection result to the determiner 153.

Upon detecting an item which is unregistered in the reference information, the detector 152 may store the item with a detection level of "high" in the setting list as a default setting. Further, when the rider is the owner of the vehicle M and the detector 152 has detected the presence of an item which is unregistered in the setting list, the detector 152 may prompt the rider to register the unregistered item in the setting list via the HMI 30.

Furthermore, for example, when the detected candidate forgotten item is a useless item (trash) and has a size small enough to be removed by in-vehicle cleaning, the detector 152 may exclude the useless item from targets to be detected as candidate forgotten items.

[Functions of Determiner]

The determiner 153 performs processing for notifying of the candidate forgotten item on the basis of the detection result of the candidate forgotten item output from the detector 152. Also, when a result of the processing for notifying of the candidate forgotten item indicates that the candidate forgotten item is left by the rider, the determiner 153 selects a predetermined behavior and outputs the selection result to the event determiner 142.

The determiner 153 is set by the owner to notify of an item whose detection level in the setting list is equal to or higher than a predetermined level as a candidate forgotten item. For example, the determiner 153 performs control such that, if items with detection levels of "high" and "slightly high" in the setting list shown in FIG. 4 are detected as candidate forgotten items, the rider is notified of the items and, on the other hand, if items with detection levels of "slightly low" and "low" are detected as candidate forgotten items, the rider is not notified of the items. The owner may be able to change the predetermined level.

The determiner 153 performs the notification processing to output notification information of candidate forgotten items to the rider on the basis of an instruction output from the detector 152. The determiner 153 determines information on the candidate forgotten item of which the rider is to be notified and a method for notifying of the candidate forgotten item. The information on the candidate forgotten item for notification includes at least one of the presence of the candidate forgotten item or the position where the candidate forgotten item is placed. For example, if the candidate forgotten item is an item that is registered in the setting list and the name of the item is also set, the notification information of the candidate forgotten item may also include the name of the item. The method for notifying of the candidate forgotten item is, for example, sound notification using the speaker or buzzer of the HMI 30 or visually appealing notification such as displaying of a message on the display of the HMI 30 or lighting of an LED of the notification unit 72A.

When the candidate forgotten item is an item accommodated in the in-vehicle equipment 72, the determiner 153 may instruct a discharge mechanism 72b of the in-vehicle equipment 72 to discharge the candidate forgotten item into the occupant compartment space. For example, when the in-vehicle equipment 72 is a DVD reproducing device, the discharging corresponds to a behavior upon pressing of a disc ejection button on the DVD reproducing device. It is to be noted that the discharging indicates a behavior of keeping the state in which the in-vehicle equipment 72 can control the candidate forgotten item. For example, the discharging does not include moving the candidate forgotten item to a location physically separated from the in-vehicle equipment 72 (for example, dropping the item on the floor in the occupant compartment). For example, when the in-vehicle equipment 72 is a DVD reproduction device having a disc ejection button and the DVD is a candidate forgotten item, the determiner 153 instructs a disc discharge driving source provided in the disc outlet (for example, a motor that is driven when the disc is inserted or ejected) to discharge the DVD into the occupant compartment space of the vehicle M.

Further, even if the door of the vehicle M has already been locked by the rider, the determiner 153 may perform vehicle control when notifying the rider of the candidate forgotten item such that the vehicle door is automatically unlocked or the power window is operated to be widely opened in conjunction with the notification of the candidate forgotten item to save the rider the effort of unlocking the vehicle door and to make it easier to take the forgotten item.

On the basis of a detection result indicating the presence of a candidate forgotten item that is left, which has been output from the detector 152, the determiner 153 notifies, for example, the terminal device 300 of the owner of the presence of the candidate forgotten item that is left. If the candidate forgotten item that is left is a forgotten item, the rider responds via the terminal device 300 that he or she will go to the vehicle M to take the forgotten item. If the candidate forgotten item is intentionally left in the vehicle and is not a forgotten item, the rider responds via the terminal device 300 that he or she will not collect the item because it is not a forgotten item. When the forgotten item is an item accommodated in the in-vehicle equipment 72 and has been discharged into the occupant compartment space upon detection as a candidate forgotten item, the determiner 153 may cause the item to be accommodated again in the in-vehicle equipment 72.

Further, the determiner 153 selects a predetermined behavior on the basis of a detection result indicating the presence of a candidate forgotten item that is left, which has been output from the detector 152, and the response to the notification of the presence of the candidate forgotten item of the rider. The predetermined behavior is, for example, not to start the vehicle M even when the vehicle M is scheduled to head for another destination after the rider alights the vehicle.

For example, the determiner 153 may select a predetermined behavior on the basis of the detection level in the setting list. For example, if the detection level in the setting list is "high," the determiner 153 selects a predetermined behavior such that the vehicle M does not start, but if the detection level is "slightly high," the determiner 153 selects a predetermined behavior such that the vehicle M waits in a nearby parking space for a predetermined period of time rather than heading for the next destination and moves to the alighted position (or a location designated by the owner) if there is a notice from the owner.

[Functions of Learning Unit]

The learning unit 154 learns the detection level information 155 and the reference information 156, for example, on the basis of a detection result indicating the presence of a candidate forgotten item that is left, which has been output from the detector 152, and the response to the notification of the presence of the candidate forgotten item of the rider.

If a plurality of riders are riding in the vehicle M, the owner of an item may change as when the owner of the vehicle M who is riding in the vehicle M gets a souvenir from a guest while the guest is sharing a ride with the owner of the vehicle M. In this case, it is not desirable to detect the souvenir as the guest's forgotten item when the guest alights. Thus, the learning unit 154 may analyze the conversation of each rider in the occupant compartment acquired by the situation information acquirer 151, learn the analysis result, and appropriately update the setting list.

[Reference Information]

The reference information 156 stores, for example, information set by the owner of the vehicle M such that, among items that have been brought into the vehicle M, items of which the owner desires that notification should always be made when forgotten are targets to be detected as candidate forgotten items. The reference information 156 also stores, for example, information set by the owner of the vehicle M such that, among items that have been brought into the vehicle M, an in-vehicle fitting (such as a tire chain) may be excluded from the targets to be detected as candidate forgotten items. The reference information 156 may store image data of the item captured by the in-vehicle camera 70 or may store information that the owner has set via the HMI 30 or the terminal device 300. Further, in the reference information 156, the owner of the vehicle M may register information regarding an item in advance outside the vehicle M or the vehicle control system 1 such as on a personal computer (PC), and store the registered information.

The reference information 156 stores the storage result, for example, as a setting list in which a recognition result of each item (a property of captured image data or IC tag information), the name of the item, the detection level of the item, a flag setting indicating whether or not the item is an in-vehicle fitting, and the like are linked.

[Functions of Event Determiner]

The event determiner 142 sets an automated driving event on the basis of an instruction output from the forgotten item management unit 150 and outputs the automated driving event to the target trajectory generator 144.

When a forgotten item of the rider has been detected by the forgotten item management unit 150, the event determiner 142 may cause the vehicle M to travel with a behavior different from a predetermined behavior. For example, even when the behavior plan generator 140 has scheduled an unmanned automated driving event for moving to a location separated from the alighted space of the rider from the boarding/alighting schedule of the rider of the vehicle M, the event determiner 142 selects, if a candidate forgotten item of the rider is detected by the forgotten item management unit 150, a behavior different from the schedule such that the vehicle M parks and waits at a location separated from the alighted space of the rider or the vehicle M does not start and waits at the alighted location until there is a response from the rider. Even when a completely identical forgotten item has been detected by the forgotten item management unit 150, the event determiner 142 may select the same behavior as scheduled if the vehicle M was scheduled to wait near the alighted location of the rider.

Further, the event determiner 142 acquires the movement schedule of the vehicle M, for example, on the basis of the schedule of the rider of the vehicle M as well as the latest schedule from the management device 500, and updates the movement schedule of the vehicle M as needed. The movement schedule of the vehicle M is, for example, information regarding a schedule for about several hours at the shortest or for a longer period of about several days depending on who boards the vehicle M or when the rider boards the vehicle M. The movement schedule of the vehicle M may be set by the owner of the vehicle M or may be set by the administrator of the management device 500 when the vehicle M is used as a ride share vehicle.

[Functions of Target Trajectory Generator]

The target trajectory generator 144 generates a target trajectory on the basis of the automated driving event output from the event determiner 142. For example, when an unmanned automated driving event for moving from the alighted location of the rider to a parking space is output, the target trajectory generator 144 generates a target trajectory for heading from the alighted location to the parking space. The target trajectory generator 144 outputs the target trajectory to the second controller 160.

[Process Flow]

Figure 5:
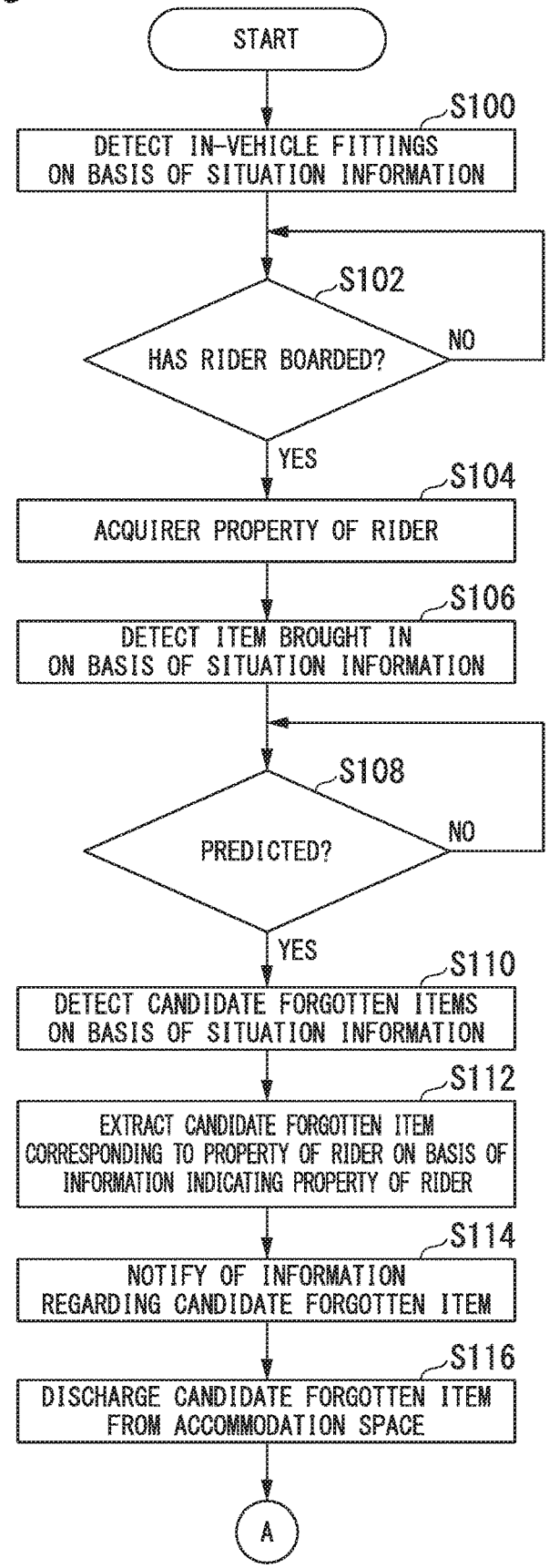
FIG. 5 is a flowchart showing a part of the flow of a process for detecting forgotten items by the forgotten item management unit.
Figure 6:
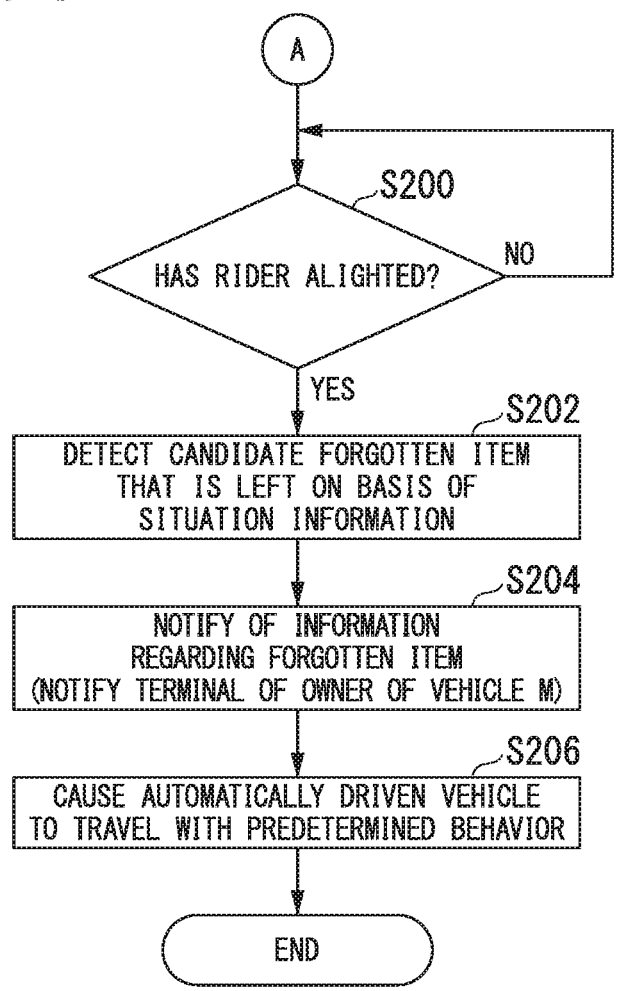
FIG. 6 is a flowchart showing a part of the flow of a process for detecting forgotten items by the forgotten item management unit.

FIGS. 5 and 6 are flowcharts showing an example of the flow of a driving control process of the vehicle control system 1 when a forgotten item has been detected by the forgotten item management unit 150. FIG. 5 is an example of the flow of a process for detecting candidate forgotten items.

First, the situation information acquirer 151 detects in-vehicle fittings on the basis of situation information (step S100). Next, the situation information acquirer 151 determines whether or not the rider has boarded the vehicle (step S102). When it is not determined that the rider has boarded the vehicle, the situation information acquirer 151 performs the process of step S102 again after a predetermined time elapses. Upon determining that the rider has boarded the vehicle, the situation information acquirer 151 acquires a property of the rider (step S104). Next, the situation information acquirer 151 detects an item brought in by the rider on the basis of the situation information (step S106).

Next, the detector 152 determines whether or not the rider is predicted to alight the vehicle (step S108). If it is not determined that the rider is predicted to alight the vehicle, the detector 152 performs the process of step S108 again after a predetermined time elapses. Upon determining that the rider is predicted to alight the vehicle, the detector 152 detects candidate forgotten items (step S110) on the basis of the situation information. Next, the detector 152 extracts a candidate forgotten item associated with the property of the rider on the basis of information indicating the property of the rider (step S112). Next, the determiner 153 notifies of information regarding the candidate forgotten item (step S114). Next, the determiner 153 discharges the candidate forgotten item from an accommodation space (step S116).

FIG. 6 shows an example of the flow of a driving control process when a forgotten item is left. The situation information acquirer 151 determines whether or not the rider has alighted the vehicle (step S200). If it is not determined that the rider has alighted the vehicle, the situation information acquirer 151 performs the process of step S200 again after a predetermined time elapses. Upon determining that the rider has alighted the vehicle, the detector 152 detects a candidate forgotten item that is left on the basis of the situation information (step S202). Next, the determiner 153 notifies the terminal device 300 of the owner of the vehicle M of information regarding the candidate forgotten item (step S204). Next, the event determiner 142 causes the automatically driven vehicle to travel with a predetermined behavior (step S206). Then, the process of this flowchart ends.

As described above, according to the vehicle control system 1 of the first embodiment, vehicle control that prevents the rider from forgetting to take items can be performed through the forgotten item management unit 150 which detects and notifies of candidate forgotten items in the vehicle M on the basis of the situation information when the rider alights the vehicle M. In addition, according to the vehicle control system 1 of the first embodiment, it is possible to identify candidate forgotten items and in-vehicle fittings set by the owner of the vehicle M by detecting candidate forgotten items according to the setting of accommodation spaces of items or items brought in by the rider through the forgotten item management unit 150 that provides the notification. Further, according to the vehicle control system 1 of the first embodiment, when a candidate forgotten item is left in the vehicle M, the forgotten item management unit 150 notifies the rider of the candidate forgotten item, and when the rider responds that it is a forgotten item, the travel schedule is changed to one that assumes the rider's collection of the forgotten item, and thus vehicle control facilitating the rider's collection of the forgotten item can be performed through the event determiner 142 that determines a traveling event with a predetermined behavior in accordance with the changed travel schedule and the target trajectory generator 144 that generates a target trajectory on the basis of the traveling event to cause the automatically driven vehicle to travel accordingly.

Second Embodiment

Next, a vehicle control system 1 of a second embodiment will be described. In the following description, portions having the same functions as those described in the first embodiment are denoted by the same names and reference signs and detailed descriptions of the functions thereof will be omitted.

In the vehicle control system 1 according to the second embodiment, a part or the entirety of the forgotten item management unit 150 may be arranged outside the vehicle control device 5. The forgotten item management unit 150 operates, for example, on the management device 500 that controls a plurality of ride share vehicles. Therefore, the following description will focus on points changed when the forgotten item management unit 150 is disposed outside the vehicle control device 5. The vehicle control system 1 of the second embodiment will also be described mainly assuming the case in which the vehicle M is a ride share vehicle.

[Forgotten Item Management Unit Operating on Management Device]

A result of recognition of situation information of the rider of the vehicle M is output to the forgotten item management unit 150 via the communication device 20 of the vehicle control device 5. The forgotten item management unit 150 performs processing for notifying of candidate forgotten items and processing for selecting a predetermined behavior and outputs the processing results to the vehicle control device 5. Learning results stored in the learning unit 154 may be used to detect forgotten items of all ride share riders to whom services are to be provided by the automobile manufacturer or the ride share administrator.

[Adjustment of Detection Levels of Forgotten Items in Accordance with Boarding/Alighting Schedule of Rider]

The management device 500 manages the boarding/alighting schedules of riders who use a plurality of ride share vehicles and the setting lists of the riders in combination. The forgotten item management unit 150 determines the degrees of detection of candidate forgotten items in the vehicle M on the basis of the boarding/alighting schedule of each rider.

The determiner 153 adjusts the detection level at which the rider is notified of the presence of the candidate forgotten item on the basis of the schedule information of the rider in accordance with whether the rider is scheduled to temporarily alight the vehicle or is scheduled to finally alight the vehicle. The final alighting corresponds to, for example, the case in which the rider is physically separated from the vehicle M out of a predetermined range (for example, about 1 [km] from the vehicle M) after the rider alights the vehicle M, the case in which a predetermined time (for example, about 2 [hours]) or longer is left until the next scheduled boarding time, or the case in which another ride share rider is scheduled to board the vehicle next. The temporary alighting is alighting which does not apply to the final alighting and, for example, corresponds to the case in which the rider and the vehicle M physically stay within the predetermined range or the case in which, upon the alighting, the predetermined time or shorter is left until the next scheduled boarding time. For example, when the rider is scheduled to finally alight the vehicle, the determiner 153 always notifies the rider of all candidate forgotten items, but when the rider is scheduled to temporarily alight the vehicle, the determiner 153 notifies the rider of only items whose detection levels are "high" or "slightly high" among the candidate forgotten items.

The determiner 153 may also change the notification mode associated with the detection level in a stepwise manner on the basis of the schedule information of the rider. For example, the determiner 153 controls the notification mode such that it does not need to notify the rider of candidate forgotten items when the rider has alighted the vehicle for about 5 minutes, but notifies the rider of candidate forgotten items with detection levels of "high" when the rider has alighted for 10 minutes or longer.

[Adjustment of Boarding/Alighting Schedule of Ride Share Vehicle when Detecting Forgotten Item]

In the case in which the vehicle M is a ride shared vehicle, if a forgotten item of the rider is left, the determiner 153 changes, for example, the next destination of the vehicle M. At this time, the management device 500 allocates another vehicle to a ride share rider who was scheduled to use the vehicle M next, if necessary. If there is a notice from the rider who has left the forgotten item, the determiner 153 may limit the destination of the vehicle M within a range closer to the alighted position of the rider who has left the forgotten item than to the originally scheduled destination such that the vehicle M can head for a designated location of the rider who has left the forgotten item. In addition, the determiner 153 may cause the vehicle M to travel as scheduled, but if there is a notice from the rider who has left the forgotten item, the determiner 153 may cause the vehicle M to head for the designated location of the rider who has left the forgotten item. Changing the next destination of the vehicle M is another example of the "predetermined behavior."

Further, if no notice can be obtained from the rider who has left the forgotten item for a predetermined time or longer, for example, the determiner 153 changes the next destination to a collection location set by the ride share administrator. The determiner 153 informs the rider who has left the forgotten item that the forgotten item has been delivered to the collection location.

As described above, according to the vehicle control system 1 of the second embodiment, it is possible to realize more desirable vehicle control for preventing the rider from forgetting to take items in addition to achieving the same advantageous as those of the first embodiment, such that, in particular, even when the vehicle M is a ride shared vehicle, through the forgotten item management unit 150, it is possible to adjust the degree of detection as a candidate forgotten item on the basis of the alighting/boarding schedule of the rider or to select a desirable behavior of the vehicle M when the rider has forgotten to take an item.

Although examples in which each candidate forgotten item is a tangible item have been described in the above embodiments, the candidate forgotten item may also be information (for example, photograph data or music data) that is stored in the in-vehicle equipment 72 by the rider. When the candidate forgotten item is information stored in the in-vehicle equipment 72, for example, the determiner 153 may perform a process for removing the information which is the candidate forgotten item from the in-vehicle equipment 72 after temporarily saving the information in a storage portion of the management device 500 with which only the rider who is estimated to be the owner of the candidate forgotten item can communicate.

[Hardware Configuration]

Figure 7:
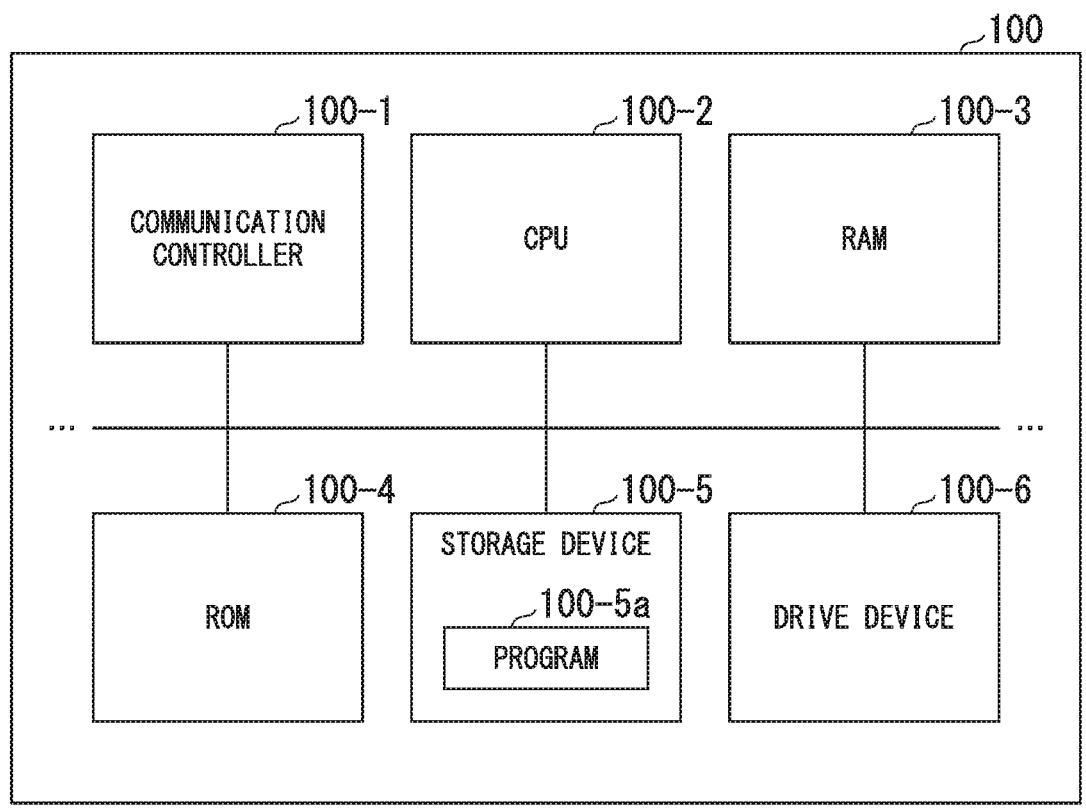
FIG. 7 is a diagram showing an example of a hardware configuration of an automated driving control device according to an embodiment.

FIG. 7 is a diagram showing an example of the hardware configuration of the automated driving control device 100 according to the embodiment. As shown, the automated driving control device 100 is configured such that a communication controller 100-1, a CPU 100-2, a random access memory (RAM) 100-3 used as a working memory, a read only memory (ROM) 100-4 storing a boot program or the like, a storage device 100-5 such as a flash memory or an HDD, a drive device 100-6, or the like are connected to each other via an internal bus or a dedicated communication line. The communication controller 100-1 performs communication with components other than the automated driving control device 100. The storage device 100-5 stores a program 100-5a to be executed by the CPU 100-2. This program is loaded in the RAM 100-3 by a direct memory access (DMA) controller (not shown) or the like and then executed by the CPU 100-2. Thereby, some or all of the event determiner 142, the target trajectory generator 144, and the forgotten item management unit 150 are realized.

The embodiments described above can be expressed as follows.

A vehicle control device including:
a storage device configured to store a program; and
a hardware processor, wherein the hardware processor is configured to execute the program stored in the storage device to:
acquire situation information indicating an in-vehicle situation of an automatically driven vehicle;
detect a forgotten item that is left in the automatically driven vehicle on the basis of the acquired situation information; and
control the automatically driven vehicle on the basis of a result of the detection.

Although the modes for carrying out the present invention have been described above by way of embodiments, the present invention is not limited to these embodiments at all and various modifications and substitutions can be made without departing from the gist of the present invention.

What is claimed is:

1. A vehicle control device comprising:
a situation information acquirer configured to acquire usage situation information that indicates an in-vehicle usage situation of an automatically driven vehicle;
a detector configured to detect a forgotten item that is left in the automatically driven vehicle on a basis of the usage situation information acquired by the situation information acquirer; and
a controller configured to control the automatically driven vehicle on the basis of a result of a detection of the detector,
wherein the detector is configured to acquire information indicating a property of a rider of the automatically driven vehicle and to change a reference for detecting the forgotten item according to the acquired information indicating the property of the rider,
wherein the situation information acquirer is configured to predict alighting of the rider, and
wherein the controller is configured to, if the situation information acquirer predicts that the rider is about to alight the automatically driven vehicle, instruct a discharge mechanism associated with an accommodation space to discharge the forgotten item accommodated in the accommodation space into a space in the automatically driven vehicle.

2. The vehicle control device according to claim 1, wherein the detector is configured to change the reference for detecting the forgotten item according to whether the rider of the automatically driven vehicle is an owner of the automatically driven vehicle or a temporary user thereof.

3. The vehicle control device according to claim 1, wherein the controller is configured to, if the forgotten item is detected by the detector, cause the automatically driven vehicle to travel with a behavior different from a predetermined behavior after the rider alights the automatically driven vehicle.

4. The vehicle control device according to claim 3, wherein the different behavior includes causing the automatically driven vehicle not to start or causing the automatically driven vehicle to travel to a destination different from a destination set in the predetermined behavior.

5. The vehicle control device according to claim 1, wherein
the situation information acquirer is configured to, if the situation information acquirer predicts that the rider is about to alight the automatically driven vehicle, cause a notification unit to output notification information including at least one of presence of the forgotten item or a position of the forgotten item.

6. The vehicle control device according to claim 5, wherein the notification unit is configured to, after the rider alights the automatically driven vehicle, output the notification information if the automatically driven vehicle is set to travel toward a destination outside a predetermined range including a position where the rider alights the automatically driven vehicle.

7. The vehicle control device according to claim 1, wherein the detector is configured to detect the forgotten item using reference information which is stored in a storage portion and based on an in-vehicle situation in a state without the forgotten item, and
the vehicle control device further comprises a learning unit configured to learn the reference information on the basis of at least one of registration information registered by the rider or the usage situation information.

8. The vehicle control device according to claim 7, wherein the learning unit is configured to learn the reference information on the basis of a result of comparison between a situation before the rider alights the automatically driven vehicle and another situation after the rider alights the automatically driven vehicle.

9. The vehicle control device according to claim 1, wherein the detector is configured to detect an object that satisfies a predetermined condition among objects left in the automatically driven vehicle as the forgotten item.

10. The vehicle control device according to claim 1, wherein the usage situation information is identification information related to the rider of the automatically driven vehicle.

11. The vehicle control device according to claim 1, wherein the usage situation information is an identification of the item.

12. The vehicle control device according to claim 1, wherein the usage situation information is at least one of a boarding or an alighting schedule of the rider.

13. The vehicle control device according to claim 1, wherein the controller controls the automatically driven vehicle for collection of the forgotten item by the rider.

14. A vehicle control method comprising:
a computer that acquires situation information indicating a usage situation of in-vehicle equipment of an automatically driven vehicle;
detecting a forgotten item that is left in the automatically driven vehicle on a basis of the situation information;
controlling the automatically driven vehicle on the basis of a result of a detection and for collection of the forgotten item by a rider of the automatically driven vehicle;
acquiring information indicating a property of the rider of the automatically driven vehicle and changing a reference for detecting the forgotten item according to the acquired information indicating the property of the rider;
predict alighting of the rider; and
based on the predicting the rider is about to alight the automatically driven vehicle, instructing a discharge mechanism associated with an accommodation space to discharge the forgotten item accommodated in the accommodation space into a space in the automatically driven vehicle.

15. A non-transitory computer-readable recording medium recording a vehicle control program causing an in-vehicle computer to:
acquire situation information indicating a usage situation of in-vehicle equipment of an automatically driven vehicle;

detect a forgotten item that is left in the automatically driven vehicle on a basis of the acquired situation information;

control the automatically driven vehicle on the basis of a result of a detection, wherein the situation information comprises at least one of identification information related to a rider of the automatically driven vehicle, identification of the forgotten item, a boarding scheduled of the rider, or an alighting schedule of the rider;

acquire information indicating a property of the rider of the automatically driven vehicle and to change a reference for detecting the forgotten item according to the acquired information indicating the property of the rider, predict alighting of the rider, and based on a prediction that the rider is about to alight the automatically driven vehicle, instruct a discharge mechanism associated with an accommodation space to discharge the forgotten item accommodated in the accommodation space into a space in the automatically driven vehicle.

\* \* \* \* \*